Feb. 1, 1966     E. J. HENKEL     3,232,140
ROTARY INDEXING DRIVE
Filed Feb. 4, 1963     3 Sheets-Sheet 1
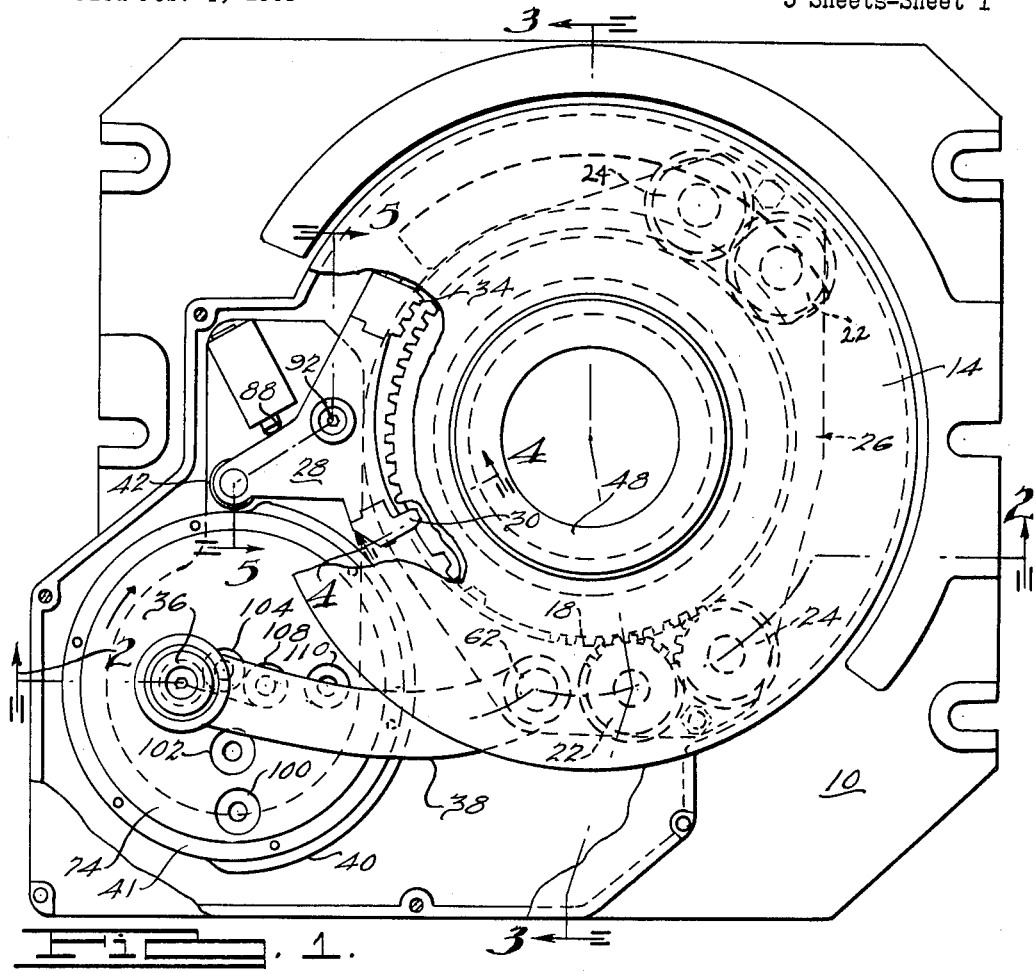
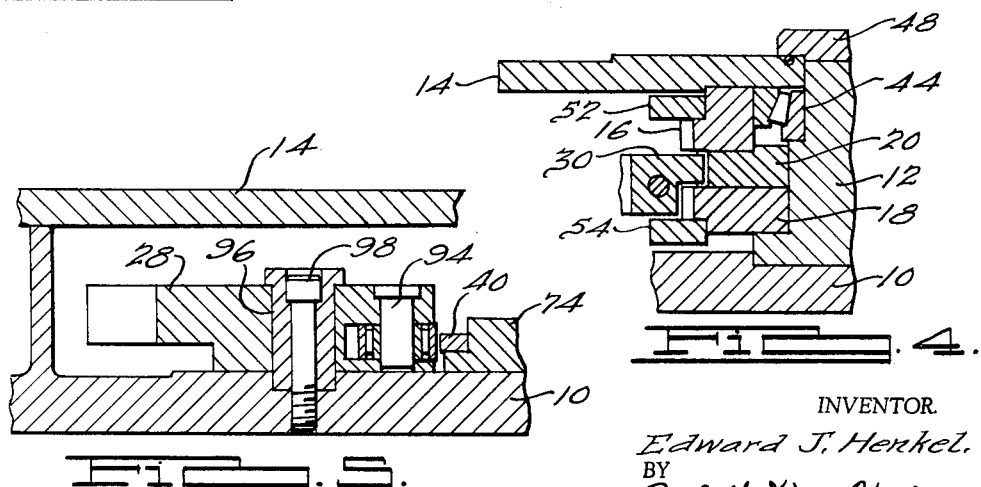
INVENTOR.
Edward J. Henkel.
BY
Balluff & McKinley
ATTORNEYS.

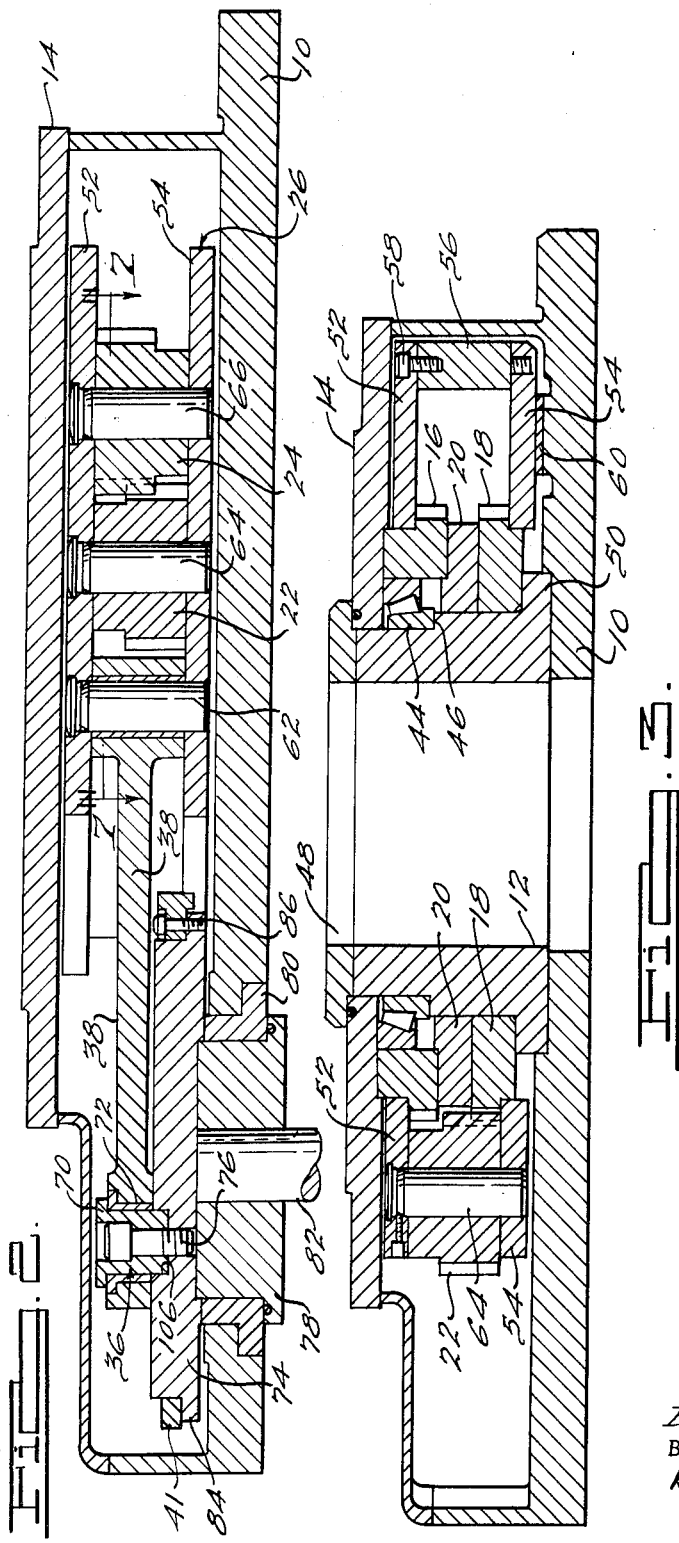

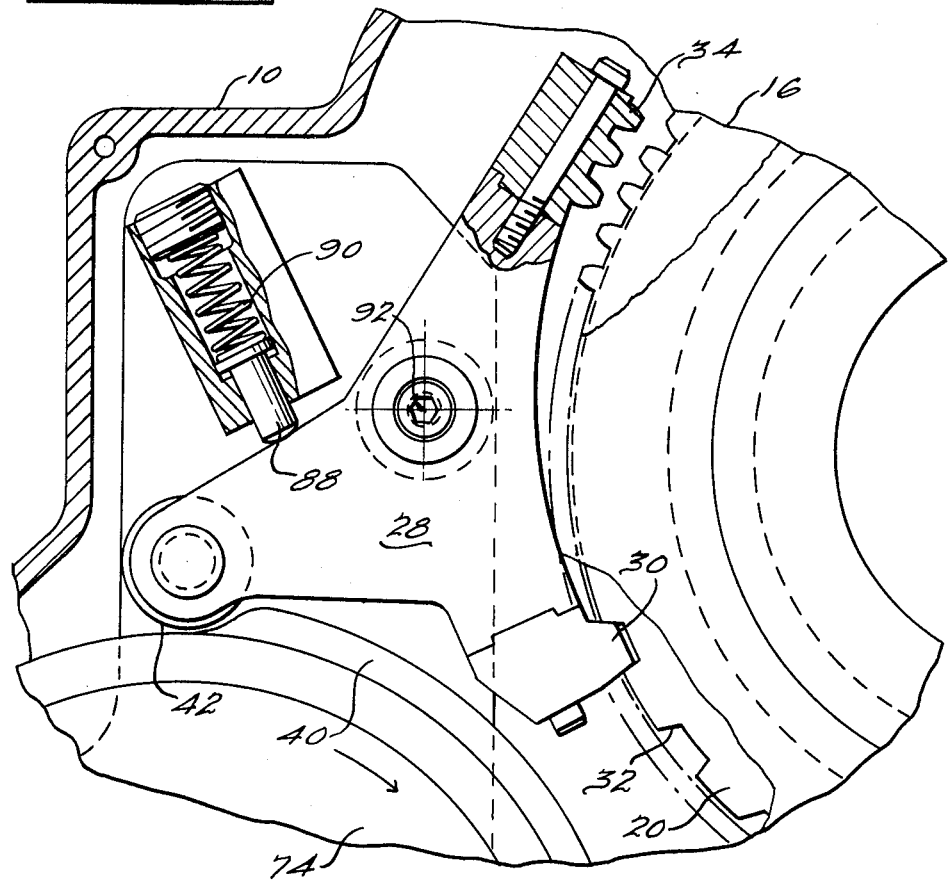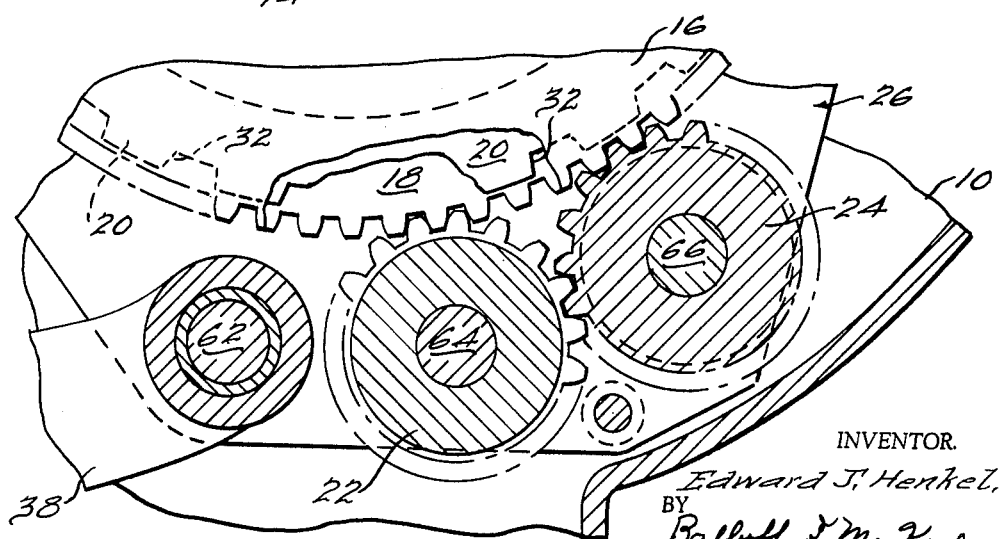

United States Patent Office 3,232,140
Patented Feb. 1, 1966

3,232,140
ROTARY INDEXING DRIVE
Edward J. Henkel, 31625 Briarcliff, Franklin, Mich.
Filed Feb. 4, 1963, Ser. No. 255,752
16 Claims. (Cl. 74—822)

This invention relates in general to rotary indexing drives and in particular to rotary indexing tables. In its broadest aspect the invention resides in a novel and efficient drive suitable for a use in rotary indexing tables, indexing heads for machine tools, stock feeds, and other applications where indexing or an intermittent drive is required.

The invention makes it possible to build a rotary indexing table of about one-third the height of machines of comparable capacity and at less cost. A rotary drive embodying the invention also provides positive acceleration and deceleration of the load and makes possible the moving of greater loads at higher speeds and with more efficiency than is possible with conventional drives of this type. A rotary indexing table embodying the invention is also unique because of the accuracy of the indexing and the wide range of adjustability which may be provided in the drive system. Thus, by relatively simple adjustments the user may adjust a rotary table so that it will index the same through a selected arc in a wide range.

A principal object of the invention therefore is to provide a novel and efficient rotary indexing drive.

Another object of the invention is to provide a novel, compact, and efficient rotary indexing table.

Other and further objects of the invention will be apparent from the following description and claims and may be understood by reference to the accompanying drawings, of which there are three sheets, which by way of illustration show a preferred embodiment of the invention and what I now consider to be the best mode of applying the principles therof. Other embodiments of the invention may be used without departing from the scope of the present invention as set forth in the appended claims.

In the drawings:

FIGURE 1 is a plan view with parts broken away of a rotary indexing table embodying the invention;

FIGURE 2 is an enlarged sectional view taken generally along the staggered line 2—2 of FIGURE 1;

FIGURE 3 is an enlarged sectional view taken generally along the staggered line 3—3 of FIGURE 1;

FIGURE 4 is an enlarged fragmentary sectional view taken on the line 4—4 of FIGURE 1;

FIGURE 5 is an enlarged fragmentary sectional view taken along the line 5—5 of FIGURE 1;

FIGURE 6 is an enlarged fragmentary plan view of the means for locking the rotary plate in an indexed position; and FIGURE 7 is an enlarged fragmentary sectional view of the pinion gearing taken along the line 7—7 of FIGURE 2 and showing its relation to the main gears.

As illustrated in the drawings, a rotary indexing drive embodying the invention forms an integral part of a rotary indexing table which comprises in general a base 10, a shaft 12, a rotary surface plate or table 14 journaled on the shaft 12, a pair of gears 16 and 18 rotatable on the shaft, an index plate 20 rotatable on the shaft 12 and fixed to the gear 16 for rotation therewith, a pair of pinion gears 22 and 24 in mesh with each other, the gear 22 being in mesh with the gear 18 and the gear 24 being in mesh with the gear 16, an oscillatable carrier 26 for the pinion gears 22 and 24, and means to alternately lock the index plate 20 or the gear 18 against rotation, said means comprising a rocker 28 having a lug 30 for cooperation with the notches 32 in the index plate 20 and lugs or teeth 34 engageable with the teeth of the gear 18.

The indexing table further includes drive means comprising a crank 36, a connecting rod or pitman 38 interconnecting the crank 36 and the carrier 26 for oscillating the latter, and a rotary cam 40 cooperable with a cam follower 42 carried on the rocker 28 for shifting the latter so as to separate the lug 30 from the index plate 20 and to engage the teeth 34 with the teeth of the gear 18.

The table 14 is fixed to gear 16 and the index plate 20 so that these three parts will rotate together as a unit, which for convenience will sometimes hereinafter be referred to as the rotary table or surface plate. This unit is supported by a tapered roller bearing 44, which in turn is supported upon the shaft 12 adjacent the external shoulder 46 thereof. The shaft 12 is a stub shaft which is fixed to the base 10. A ring 48 secured to the upper end of the shaft 12 overlaps the plate 14 and has a running fit therewith. The shaft 12 may be hollow and in line with an opening in the base 10 whereby the hollow shaft 12 provides a path or channel through which work may be passed from one side of the rotary index table to the other. This is advantageous for feeding stock to or scrap from machines mounted upon or associated with the table 14. The gear 18 is mounted on the shaft 12 between the index plate 20 and a peripheral flange 50 and the shaft 12 and has a running fit with the shaft 12 and the index plate 20.

The carrier 26 comprises a pair of spaced plates 52 and 54 which have a running fit with the gears 16 and 18 respectively so as to be freely rotatable relative thereto. The plates 52 and 54 are interconnected by one or more posts, such as 56, a reduced end of which is threaded into a threaded opening in the plate 54. A threaded opening in the other end of the post 56 receives the screw 58, the head of which reacts against the upper surface of the plate 52. One or more hardened wear plates 60 may be affixed to the base 10 beneath the lower plate 54 for slidingly supporting the latter and the carrier 26. The carrier 26 includes a plurality of shafts or pins 62, 64 and 66 which extend between and are carried by the plates 52 and 54, the pin 62 forming a connection between the pitman 38 and the carrier 26, while the pins 64 and 66 rotatably support the pinion gears 22 and 24 in mesh with each other and with the gears 16 and 18. The teeth of the gear 22 are cut away at the upper end thereof in FIG. 2 so that they do not mesh with the gear 16, and the teeth of the gear 24 are cut away at the lower end thereof so that they do not mesh with the gear 18.

The crank 36 comprises an eccentric bushing 70 which extends through sleeve 72 carried by one end of the connecting rod 38 and is adjustably seated in a socket 106 in a rotor or disc 74, the bushing 70 being fixed in its adjusted position by an Allen head screw 76 which is threadedly secured in a threaded opening in the disc 74. The disc 74 is fixed to a rotary drive member 78 rotatable in sleeve 80 secured in the base 10. A drive shaft 82 is keyed to the driving element 78 for rotating the same and the disc 74 secured thereto for moving the crank 36 through its orbital path about the axis of the shaft 82.

The shaft 82 is connected to a prime mover, such as an electric motor, through variable speed reduction gearing whereby the shaft 82 and the parts driven thereby may be driven at the desired constant speed. The cam 40 comprises a ring 41 which is seated on and secured to a rim 84 on the periphery of the disc 74. A series of screws 86 secure the cam ring 41 to the rim 84, and the latter is provided with a series of threaded openings for receiving the screws 86 whereby the position of the cam 40 relative to the crank 36 may be adjusted.

As shown in FIG. 1, the cam 40 extends through an arc of about 180° of the ring 41 and, as the disc 74 rotates in a clockwise direction, is adapted to engage the cam follower 42 and shift the rocker 28 so as to disengage the lug 30 from one of the notches 32 in the index plate 20. A spring pressed pin 88 backed up by a spring 90 reacts on the rocker 28 so as to bias the lug 30 toward one of the series of notches 32 in the index plate 20. The rocker 28 is pivoted for rocking about the axis 92. Looking at FIG. 1, the cam 40 will engage the cam follower 42 after movement of the crank 36 through 180° of travel so as to shift the rocker 28 about its pivot and disengage the lug 30 from the notch 32 in the plate 20 and to engage the teeth 34 on the rocker 28 with the teeth of the gear 18 for locking the same against rotation.

As shown in FIG. 5, the cam follower 42 is a roller journaled on the pin 94 carried by the rocker 28. The rocker 28 is journaled on a sleeve 96 secured to the base 10 by the Allen head screw 98. As in the case of bushing 70, the hole in the sleeve 96 through which the screw 98 extends may be disposed off-center relative to the axis of the sleeve 96 whereby the axis about which the rocker 28 pivots may be adjusted so as to assure proper engagement between the lug 30 and the notches 32 in the plate 20 and the teeth 34 and the teeth of the gear 18.

The index plate 20 is provided with a series of notches 32 disposed about the periphery thereof for anchoring the plate 20 at the desired location. The disc 74 is provided with a series of sockets 100, 102, and 104, and a second series of sockets 106, 108 and 110. When the crank 36 is positioned so that the bushing 70 thereof is in the socket 106, the rotary table 14 will be indexed 8 times per revolution, that is, at 45° intervals. By locating the crank 36 in the socket 108, the table will be indexed at 30° intervals, and by locating the crank 36 in the socket 110, the rotary table will be indexed at 90° intervals. The eccentric bushing 70 makes it possible to properly locate the center of the crank 36 so that the carrier 26 which is moved by the crank through pitman 38 will oscillate through the proper arc so as to bring the notches 32 in the index plate 20 into proper alignment with the lug 30. To compensate for any slight misalignment, the slides of the notches 32 and the end of the lug are tapered as illustrated so that the index plate 20 and the table 14 rotatable therewith will always be accurately located by the rocker 28 when in the position corresponding with that illustrated in FIG. 6.

The cam 40 should be set so that it will be disengaged from the follower 42 when the notch 32 into which the lug 30 is to move moves into registry with the lug 30. The crank 36 in the position illustrated in the drawings is at the end of, let us say, the retractile or return stroke of the connecting rod 38, and the cam 40 must be positioned relative to the crank 36 so that at the end of the opposite or forward stroke of the crank the cam 40 will have moved through 180° so as to cooperate with the cam follower 42 to shift rocker 28 and engage the teeth 34 with the teeth of the gear 18 and separate the lug 30 from the notch 32.

It will be evident that upon the forward stroke of the crank 36, the pitman 38 will shift the carrier 26 in a counterclockwise direction, looking at FIGS. 1, 6 and 7. Since the index plate 20 and the gear 16 are locked against rotation at such time, the pinion gear 24 which is in mesh with the teeth of the gear 16 will roll counterclockwise (FIG. 7) about the axis of 66 and move in a counterclockwise direction about the gear 16. Since the pinion gear 22 is in mesh with the pinion gear 24, the latter will turn in a clockwise direction about its axis, and since the pinion gear 22 is in mesh with the teeth of the gear 18, the gear 18 will be moved in a counterclockwise direction.

At the end of the forward stroke of the pitman 38 the cam 40, as previously noted, will disengage the lug 30 from the notch 32 in the index plate 20 and engage the teeth 34 with the gear 18 so that as the pitman 38 begins its return stroke due to continuing movement of the crank 36 through its orbit, the gear 18 will be locked against rotation while the gear 16 will be free to turn. Thus the gear 22 will rotate in a clockwise direction about its axis and move in a clockwise direction about the gear 18, while the pinion gear 24 will continue to turn counterclockwise about its axis and, since it is in mesh with the teeth of the gear 16, will move the latter in a clockwise direction, thus advancing the gear 16 and the index plate 20 to the next station. As the crank 36 approaches the end of its retractile stroke, the cam 40 will pass the cam follower 42 and permit the spring pressed pin 88 to engage the lug 30 with one of the notches 32 in the index plate 20 and at the same time disengage the teeth 34 from the teeth of the gear 18.

The second series of sockets 100, 102 and 104 for the sleeve 70 of the crank 36 will respectively provide for 3, 6, or 24 positions of the table 14 per complete revolution. Thus, by location of the crank 36 in one of the sockets in the disc 74 and such adjustment of the cam 40 as may be required, the rotary indexing table may be set to index at intervals of 120°, 90°, 60°, 45°, 30°, or 15°. Obviously additional sockets may be provided in the disc 74 for the crank 36. As previously indicated, each different position of the crank will require some adjustment of the eccentric sleeve 70 so that the ends of the power and retractile strokes of the connecting rod 38 will synchronize with the shifting of the rocker 28 from one of its positions to the other.

It will be evident that the table 14 is advanced during the retractile stroke of the connecting rod 38 and that due to the motion of the crank 36 there will be a gradual acceleration, as well as a gradual deceleration, of the table 14 in its movement between each station. This is important from the standpoint of the power required to operate the indexing table under substantial loads.

While I have illustrated and described a preferred embodiment of my invention, it is understood that this is capable of modification, and I therefore do not wish to be limited to the precise details set forth but desire to avail myself of such changes and alterations as fall within the purview of the following claims.

I claim:

1. A drive comprising a shaft, a pair of gears individually rotatable about said shaft, pinion gears geared to said pair of gears and each other so as to be shiftable about the periphery thereof, means operable to lock one gear of said pair against rotation, a rotary cam means to cyclically inactivate said locking means, means operable to lock said other gear against rotation in one direction, and drive means for said cam and for shifting said pinion gears in one direction so as to advance said one gear of said pair when it is unlocked and for shifting said pinion gears in the opposite direction when said one gear is locked against rotation.

2. A drive according to claim 1 wherein said drive means comprises a crank and pitman and wherein said rotary cam means is movable with said crank.

3. A drive according to claim 2 wherein means are provided for adjusting the throw of said crank.

4. A drive according to claim 1 wherein said means to lock said other gear against rotation comprises a brake.

5. A drive comprising a shaft, a pair of gears individually rotatable about said shaft, a pair of pinion gears geared together, one pinion gear being geared to one of said pair of gears and the other pinion gear being geared to the other gear of said pair, a carrier for shifting said pinion gears while geared to said pair of gears, means biased to lock one gear of said pair against rotation, a rotary cam arranged to cyclically inactivate said locking means, means operable to lock the other gear of said pair against rotation in one direction, said drive means for said cam and said carrier so as to advance said one gear of said pair when it is unlocked and to retract said carrier when said one gear is locked against rotation.

6. A rotary indexing drive comprising a shaft, a pair of gears individually rotatable about said shaft, a pair of pinion gears geared together, one pinion gear being geared to one of said pair of gears and the other pinion gear being geared to the other gear of said pair, means locating said pinion gears for movement about the periphery of said pair of gears while geared to said pair of gears, means biased to lock one gear of said pair against rotation, cam means arranged to cyclically inactivate said locking means, means operable to lock said other gear of said pair against rotation in one direction, and drive means for said cam means and for shifting said pinion gears about the periphery of said pair of gears so as to move said one gear of said pair when it is unlocked.

7. A rotary indexing drive comprising a shaft, a pair of gears individually rotatable about said shaft, a pair of pinion gears geared together, one pinion gear being geared to one of said pair of gears and the other pinion gear being geared to the other gear of said pair, a carrier for shifting said pinion gears while geared to said pair of gears, means to cyclically lock said one gear against rotation, means operable to cyclically lock said other gear against rotation in one direction, and drive means for said carrier so as to advance said carrier and said one gear when it is unlocked and to retract said carrier when said one gear is locked against rotation.

8. A rotary indexing drive comprising a shaft, a pair of gears individually rotatable about said shaft, a pair of pinion gears geared together, one pinion gear being geared to one of said pair of gears and the other pinion gear being geared to the other gear of said pair, a carrier for shifting said pinion gears while geared to said pair of gears, means operable to lock said one gear against rotation, a rotary cam arranged to cyclically inactivate said locking means, means operable to lock said other gear against rotation in one direction, and drive means for said cam and said carrier so as to advance said carrier and said one gear when said one gear is unlocked and to retract said carrier when said one gear is locked against rotation, said drive means comprising a crank and pitman and said cam being rotatable with said crank.

9. A rotary indexing table comprising a base having a shaft, a rotary surface plate journaled for rotation on said base, gears individually rotatable on said shaft, said plate being fixed to turn with one of said gears, a pair of pinion gears geared together, one pinion gear being geared to said one gear and the other pinion gear being geared to another of said gears on said shaft, a carrier for shifting said pinion gears while geared to said gears on said shaft, means operable to lock said plate against rotation, and also operable to lock said other gear against rotation in one direction when said plate is unlocked, a rotary cam arranged to react on said means to lock said other gear and to unlock said plate, and drive means for said cam and said carrier so as to advance said carrier and plate when said plate is unlocked and to retract said carrier when said plate is locked.

10. A rotary indexing table according to claim 9 wherein said shaft is hollow.

11. A rotary indexing table according to claim 9 wherein said drive means comprises a crank, said cam is rotatable with said crank, and a connecting rod interconnects said crank and carrier.

12. A rotary indexing table comprising a base having a shaft, a surface plate journaled for rotation on said base, a pair of gears individually rotatable about the center of said shaft, said plate being fixed to turn with one of said gears, pinion gears geared to rotate together, one pinion gear being geared to one of said pair of gears and the other pinion gear being geared to the other of said pair of gears, a carrier for shifting said pinion gears back and forth while geared to said pair of gears, means movably positioned to lock said surface plate against rotation, means operable to lock said other gear against rotation in one direction, a rotary cam arranged to react on said first-mentioned means to unlock said surface plate, and drive means comprising a crank and pitman connected to said carrier so as to cause said pinion gears to advance said carrier and surface plate upon one stroke of the crank and to retract said carrier upon the opposite stroke of the crank, said cam being arranged to rotate with said crank so that said surface plate is unlocked during said one stroke of the crank.

13. A rotary indexing table comprising a base having a shaft, a surface plate journaled for rotation on said shaft, a pair of gears individually rotatable on said shaft, an index plate fixed to turn with one of said gears, a pair of pinion gears meshed to rotate together, one pinion gear being geared to one of said gears of said pair and the other pinion gear being geared to the other of said gears of said pair, a carrier for said pinion gears rotatable about the center of said shaft, means biased to lock said index plate against rotation, means operable to lock said other gear against rotation in one direction, a rotary cam arranged to react on said first mentioned means to unlock said index plate, and drive means comprising a crank and a connecting rod connected to said carrier and to said crank so as to advance said carrier and index plate when said index plate is unlocked and to retract said carrier when said index plate is locked, said cam being mounted on said crank to rotate therewith, the axis of said crank being parallel to but offset from the center of said shaft.

14. A rotary indexing table comprising a base having a shaft, a rotary surface plate journaled for rotation on said shaft, a pair of gears rotatable about said shaft, an index plate fixed to turn with said surface plate and with one of said gears, a pair of pinion gears geared together, one pinion gear being geared to one of said pair of gears and the other pinion gear being geared to the other of said gears of said pair, a carrier for shifting said pinion gears about said shaft while geared to said pair of gears, means biased to lock said index plate against rotation, means operable to lock said other gear against rotation in one direction, a rotary cam arranged to unlock said index plate, and drive means for said cam and said carrier so as to advance said carrier and index plate when said index plate is unlocked and to retract said carrier when said index plate is unlocked.

15. A rotary indexing table according to claim 14 wherein said drive means comprises a crank rotatable about an axis parallel to said shaft and a connecting rod interconnecting said crank and carrier.

16. A rotary indexing table according to claim 14 wherein said means for locking said index plate and said other gear against rotation comprises a rocker having lugs alternately engageable with said index plate and said other gear.

References Cited by the Examiner

UNITED STATES PATENTS

| | | | |
|---|---|---|---|
| 1,787,289 | 12/1930 | Thomas | 74—117 |
| 2,541,636 | 2/1951 | Chillson | 74—766 X |
| 2,834,223 | 5/1958 | Strnad | 74—117 X |
| 2,862,406 | 12/1958 | Howell | 74—768 |
| 2,876,659 | 3/1959 | Richardson | 74—766 X |

FOREIGN PATENTS 546,115  7/1956  Italy.

MILTON KAUFMAN, *Primary Examiner.*

BROUGHTON G. DURHAM, *Examiner.*